US009742486B2

(12) United States Patent
Cross

(10) Patent No.: US 9,742,486 B2
(45) Date of Patent: Aug. 22, 2017

(54) HIGH TEMPERATURE OPERATION OF AN AIRBORNE SATELLITE TERMINAL

(71) Applicant: ViaSat, Inc., Carlsbad, CA (US)

(72) Inventor: Eric L. Cross, Alpharetta, GA (US)

(73) Assignee: ViaSat, Inc., Carlsbad, CA (US)

( * ) Notice: Subject to any disclaimer, the term of this patent is extended or adjusted under 35 U.S.C. 154(b) by 53 days.

(21) Appl. No.: 14/802,799

(22) Filed: Jul. 17, 2015

(65) Prior Publication Data

US 2016/0127060 A1 May 5, 2016

Related U.S. Application Data

(60) Provisional application No. 62/075,669, filed on Nov. 5, 2014.

(51) Int. Cl.

*H04B 17/00* (2015.01)
*H04B 7/185* (2006.01)
*H04W 52/52* (2009.01)
*H04W 52/02* (2009.01)

(52) U.S. Cl.

CPC .... *H04B 7/18508* (2013.01); *H04W 52/0258* (2013.01); *H04W 52/52* (2013.01); *Y02B 60/50* (2013.01)

(58) Field of Classification Search

CPC ..... G08B 1/08; H03F 1/02; H03F 3/19; H03F 3/21; H03F 3/74; H04B 1/38; H04B 7/185; H04B 7/18508; H04B 17/00; H04B 17/40; H04L 12/40; H04L 29/14; H04M 1/00; H04Q 1/02; H04Q 1/42; H04Q 7/20

USPC .......... 330/289; 340/539.1, 139.13; 370/338; 375/211, 219; 455/67.11, 67.14, 73, 431; 701/3, 36

See application file for complete search history.

(56) References Cited

U.S. PATENT DOCUMENTS

| | | | |
|---|---|---|---|
| 3,080,816 | A | 3/1963 | Levine |
| 4,853,657 | A | 8/1989 | Cruchon et al. |
| 5,025,262 | A | 6/1991 | Abdelrazik et al. |
| 5,400,037 | A | 3/1995 | East |
| 6,196,514 | B1 | 3/2001 | Kienholz |
| 6,587,069 | B2 | 7/2003 | Ringwald et al. |

(Continued)

OTHER PUBLICATIONS

NORSAT International, Inc., Innovative Communication Solutions, Investor Presentation, 37 pages, Aug. 2014.

*Primary Examiner* — Shawkat M Ali
(74) *Attorney, Agent, or Firm* — Holland & Hart LLP

(57) ABSTRACT

Methods, systems, and devices are described for operating an airborne satellite terminal in high temperature conditions. In one method, a satellite terminal is located within an enclosure beneath a radome on an exterior of an aircraft. The satellite terminal includes a transmit amplifier that may operate in different power modes, a temperature sensor thermally coupled with the transmit amplifier, and an antenna. A transmit signal is amplified using the transmit amplifier to generate an amplified signal, which signal may be transmitted through the radome using the antenna. The temperature of the transmit amplifier may be monitored with the temperature sensor while transmitting the amplified signal. Operation of the transmit amplifier may be switched from a normal power mode to a reduced power mode to reduce a power level of the amplified signal when the monitored temperature of the transmit amplifier exceeds a temperature threshold.

30 Claims, 10 Drawing Sheets

(56) References Cited

U.S. PATENT DOCUMENTS

| | | | | |
|---|---|---|---|---|
| 7,397,442 | B2 * | 7/2008 | Hawes | H01Q 1/02 343/704 |
| 8,248,318 | B2 | 8/2012 | Wahlberg et al. | |
| 8,359,026 | B2 * | 1/2013 | de La Chapelle | H04B 7/18506 455/422.1 |
| 8,396,428 | B2 | 3/2013 | Buer et al. | |
| 8,396,496 | B2 | 3/2013 | Buer et al. | |
| 2005/0148327 | A1 * | 7/2005 | Perez | H04L 41/069 455/431 |
| 2008/0140267 | A1 * | 6/2008 | Matuska | G01O 5/005 701/3 |
| 2009/0028225 | A1 * | 1/2009 | Runyon | H01Q 1/42 375/219 |
| 2009/0322516 | A1 * | 12/2009 | Coffland | B25B 23/14 340/539.13 |
| 2010/0091747 | A1 * | 4/2010 | Dorsey | H04B 1/036 370/338 |
| 2011/0280288 | A1 * | 11/2011 | Buer | H04B 1/036 375/219 |
| 2012/0056740 | A1 * | 3/2012 | Tonello | H01P 1/26 340/539.1 |
| 2013/0207868 | A1 * | 8/2013 | Venghaus | H01Q 1/42 343/840 |
| 2013/0288610 | A1 * | 10/2013 | Toh | H03G 3/3042 455/67.14 |
| 2015/0340992 | A1 * | 11/2015 | Korol | H03F 1/0205 330/296 |

* cited by examiner

HIGH TEMPERATURE OPERATION OF AN AIRBORNE SATELLITE TERMINAL

CROSS-REFERENCES

The present application is a non-provisional of and claims priority benefit of U.S. Provisional Patent Application Ser. No. 62/075,669, filed on Nov. 5, 2014, and entitled "SYSTEMS AND METHODS FOR HIGH TEMPERATURE OPERATION OF AN AIRBORNE SATELLITE TERMINAL," the disclosure of which is incorporated herein in its entirety for all purposes.

BACKGROUND

Airborne satellite terminals may provide a communication link between an aircraft and terrestrial networks via one or more satellites. Such terminals may be located within a radome or other enclosure on the exterior of an aircraft's fuselage or other location such as the tail. These terminals typically operate over a large range of temperatures, and may operate in environments where they are subjected to high thermal loads, which may degrade performance or damage electronic components. For example, such terminals may operate when the aircraft is on the ground in a location subject to significant solar loading and high ambient temperatures that cause the components of the terminal to exceed some threshold while the aircraft is on the ground. As another example, a terminal may have a high transmission load period, where the temperature of various electronic components of the terminal may exceed the threshold for a limited period of time. In order to prevent damage to the components of the terminal, the terminal may be shut down so that it may cool to a temperature at or below the threshold. While the terminal is shut down, transmissions may not be sent nor signals received by the terminal, making the communication link unavailable to the aircraft or users aboard the aircraft until the terminal is sufficiently cooled to again safely operate.

A transmit amplifier of the terminal may amplify an uplink signal and provide it to an antenna for transmission from the terminal to a satellite. The transmit amplifier of the terminal may be one of the components that generate the most heat within the terminal. Given the transmit amplifier's thermal significance, mitigation techniques may be used to reduce the impact of the transmit amplifier on the overall thermal load of the terminal. One technique may be to relocate the transmit amplifier from outside the aircraft fuselage to a location inside the aircraft fuselage. However, the increased distance may result in high radio frequency (RF) losses between the transmit amplifier and the antenna. Another technique may be to employ expensive heat tolerant materials or various heat dissipating devices, e.g. fans, heat sinks, or forced air or liquid cooling through the fuselage into the radome housing the terminal. However, such systems can be large, heavy, expensive to design and manufacture, or unreliable, affecting overall reliability of the terminal. As a result of these deficiencies, improved systems and techniques to operate an aircraft mounted terminal are desired.

SUMMARY

Methods, systems, and devices are described for operating an airborne satellite terminal in high temperature conditions. The satellite terminal may be located within a radome on the exterior of an aircraft, and include an antenna, a transmit amplifier, a temperature sensor coupled to the transmit amplifier, and a mode control circuit. The mode control circuit may be used to switch operation of the transmit amplifier into a normal power mode, a reduced power mode, or other power modes according to a temperature of the transmit amplifier, as sensed by the temperature sensor, relative to various temperature thresholds. The transmit amplifier may use various circuits to control the amplification power of the transmit amplifier according to control signals received from the mode control circuit.

A method for operating a satellite terminal located within an enclosure beneath a radome on an exterior of an aircraft is described. The satellite terminal may include a transmit amplifier having a normal power mode and a reduced power mode, a temperature sensor thermally coupled with the transmit amplifier, and an antenna. The method may include amplifying a transmit signal using the transmit amplifier in the normal power mode to generate an amplified signal, transmitting the amplified signal through the radome using the antenna, monitoring a temperature of the transmit amplifier with the temperature sensor while transmitting the amplified signal; and switching operation of the transmit amplifier from the normal power mode to the reduced power mode to reduce a power level of the amplified signal when the monitored temperature of the transmit amplifier is greater than or equal to a first temperature threshold.

In some examples, the method includes switching to a second reduced power mode when the temperature of the transmit amplifier is greater than or equal to a second temperature threshold greater than the first temperature threshold. The second temperature threshold may be, for example, a maximum operational temperature of the transmit amplifier.

In some examples, the method includes switching the satellite terminal from the reduced power mode to the normal power mode when the temperature of the transmit amplifier is below a second temperature threshold. The first temperature threshold may be greater than the second temperature threshold.

In some examples, the first temperature threshold is a predetermined number of degrees less than a maximum operational temperature of the transmit amplifier. The satellite terminal may lack an active cooling system.

Switching from the normal power mode to the reduced power mode may include reducing a voltage bias applied to a transistor of the transmit amplifier from a first bias voltage to a reduced bias voltage. Reducing the voltage bias of the transistor may include reducing the voltage bias applied to a gate of the transistor. Additionally or alternatively, reducing the voltage bias of the transistor includes reducing the voltage bias applied to a drain of the transistor. Reducing the voltage bias applied to the transistor may include decreasing the voltage bias applied to the transistor as a linear function of the temperature for a range of temperatures greater than the first temperature threshold when the temperature is greater than the first temperature threshold.

In some examples, the normal power mode includes a pulsed operation of the transmit amplifier to generate the amplified signal. Switching from the normal power mode to the reduced power mode may include reducing a duty cycle of the pulsed operation. Switching from the normal power mode to the reduced power mode may include reducing a data rate of the signal. In some examples, the method includes notifying a modem of the reduced power mode; and receiving, at the transmit amplifier, the signal having a reduced data rate from the modem.

In some examples, the method includes selecting a first power level in the reduced power mode based on a plurality of modulation and coding values. The plurality of modulation and coding values may be organized according to a signal quality range, and the first power level in the reduced power mode may be associated with a next step down in the signal quality range from a modulation and coding value associated with a second power level in the normal power mode.

A satellite terminal for mounting within an enclosure beneath a radome on an exterior of an aircraft fuselage or other location (e.g. the tail) on the exterior of the aircraft is described The satellite terminal may include: a transmit amplifier to amplify a transmit signal to generate an amplified signal, the transmit amplifier having a normal power mode corresponding to a first power level of the amplified signal and a reduced power mode corresponding to a second power level of the amplified signal, the second power level less than the first power level; an antenna to transmit the amplified signal through the radome; a temperature sensor to produce a temperature signal indicating a temperature of the transmit amplifier; and a mode control circuit to provide a power mode control signal to the transmit amplifier to switch from the normal power mode to the reduced power mode when the temperature indicated by the temperature signal is greater than or equal to a first temperature threshold. The first temperature threshold may be, for example, a predetermined number of degrees less than a maximum operational temperature of the transmit amplifier.

In some examples, the transmit amplifier includes a transistor and a power control circuit to control the transistor according to the power mode control signal. The power control circuit may include a gate bias circuit to apply a first gate bias voltage to a gate of the transistor in the normal power mode and a reduced gate bias voltage to the gate of the transistor in the reduced power mode. The gate bias circuit may include a voltage divider and a switch having a first position and a second position. In some examples, the first position of the switch causes the voltage divider to apply the first gate bias voltage to the gate in the normal power mode, and the second position of the switch causes the voltage divider to apply the reduced gate bias voltage to the gate in the reduced power mode.

In some examples, the power control circuit includes a drain bias circuit to apply a first drain bias voltage to a drain of the transistor in the normal power mode and a reduced drain bias voltage to the drain of the transistor in the reduced power mode. The drain bias circuit comprises an adjustable-output direct current to direct current converter (DC/DC converter).

In some examples, the power control circuit includes a gate bias circuit to apply a first gate bias voltage to a gate of the transistor in the normal power mode and a reduced gate bias voltage to the gate of the transistor in the reduced power mode, a drain bias circuit to apply a first drain bias voltage to a drain of the transistor in the normal power mode and a reduced drain bias voltage to the drain of the transistor in the reduced power mode, and a microprocessor to provide a gate bias control signal to the gate bias circuit according to the power mode control signal and to provide a drain bias control signal to the drain bias circuit according to the power mode control signal. The power control may include one or more look-up tables accessible by the microprocessor to store a plurality of voltage bias values used by the microprocessor to generate the gate bias control signal and to generate the drain bias control signal.

In some examples, the mode control circuit is electrically coupled with the temperature sensor to output a second power mode control signal to switch the transmit amplifier from the reduced power mode to the normal power mode when the temperature of the transmit amplifier is less than or equal to a second temperature threshold. The second temperature threshold may be less than the first temperature threshold.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
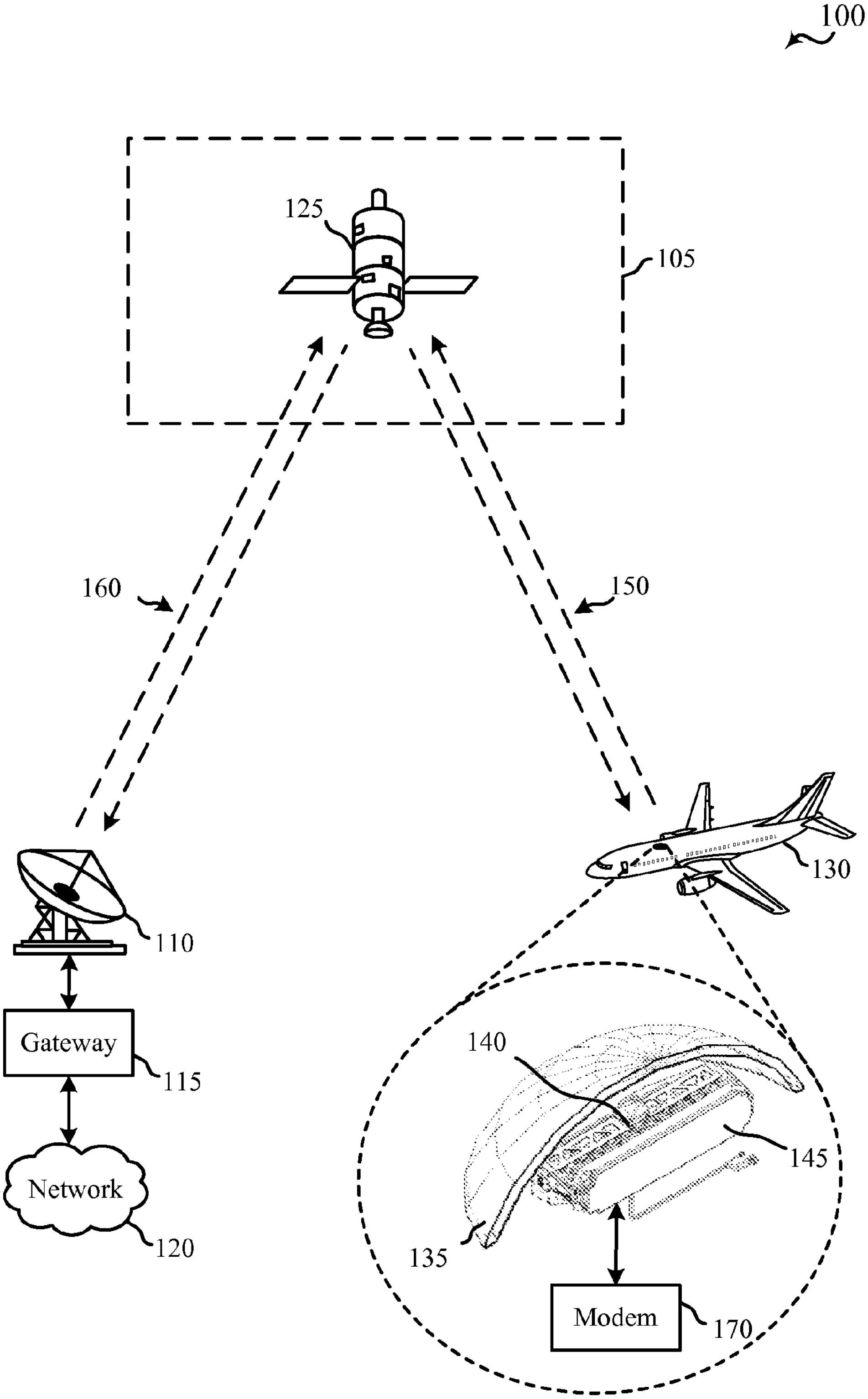
FIG. 1 shows a diagram of a satellite communication system, in accordance with various aspects of the present disclosure.

The described features generally relate to a methods, systems, and devices for operating an airborne satellite terminal in high temperature conditions.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Airborne satellite terminals that provide a communication link between an aircraft and terrestrial networks via one or more satellites may operate in high temperature environments. The satellite terminal may be located within a radome on the exterior of an aircraft, and include an antenna, a transmit amplifier, a temperature sensor coupled to the transmit amplifier, and a mode control circuit. Because the transmit amplifier of a terminal may be one of the components that generate the most heat within the terminal, thermal mitigation techniques specific to the transmit amplifier may be used to ensure that the transmit amplifier and other components under the radome stay within an acceptable temperature range during operation. Complete shutdown of the transmit amplifier above a certain temperature is one option to reduce thermal load and prevent damage to terminal components, but renders unavailable network resources to the aircraft or users aboard the aircraft. While moving the transmit amplifier to within the fuselage of the aircraft may simplify thermal mitigation and cooling, a long length of interconnect between the transmit amplifier within the fuselage and the antenna on the exterior of the aircraft may be needed, introducing significant radio frequency (RF) losses for the connection. Forced air or liquid cooling of the transmit amplifier introduces additional points of failure, leading to significant reliability concerns. Another solution is to use a relatively lower power transmit amplifier in all temperature environments to prevent the transmit amplifier from overheating when it is subject to a high temperature environment. However, due to the relatively lower transmit power used, this results in a relatively lower data rate in the non-high temperature environments. The techniques described herein provide for locating the transmit amplifier near the antenna on the exterior of the aircraft, and continue to allow higher-power operation of the transmit amplifier in many circumstances, and allow for lower power operation of the transmit amplifier under high temperature conditions.

Thus, a satellite terminal including an antenna, a transmit amplifier, a temperature sensor coupled to the transmit amplifier, and a mode control circuit may be provided within a radome on the exterior of an aircraft. The mode control circuit, which may take various forms as described in further detail herein, may be used to switch operation of the transmit amplifier into a normal power mode, a reduced power mode, and/or other power modes. The mode control circuit may compare the temperature of the transmit amplifier against various temperature thresholds to determine whether to switch to a different power mode. The transmit amplifier may use various types of control circuits to control the amplification power of the transmit amplifier according to control signals received from the mode control circuit, thus allowing the transmit amplifier to operate in various power modes according to the various temperature environments that the transmit amplifier experiences during operation. Thus, the aircraft or users aboard the aircraft may access the desired network(s) at a reduced data rate through the communications system of the aircraft during high temperature operation such as extended use on the ground, but avoid complete lack of access during shutdown of the terminal. The satellite terminal can also be implemented without active cooling system in the described systems and methods, increasing simplicity and reliability for the communications system, as well as lowering overall system cost.

FIG. 1 shows a diagram of a satellite communication system 100, in accordance with various aspects of the present disclosure. The satellite communication system 100 includes a satellite system 105, including at least one satellite 125, a gateway 115, a gateway antenna system 110, and an aircraft 130. The gateway 115 communicates with one or more networks 120. In operation, the satellite communication system 100 provides for two-way communications between the aircraft 130 and the one or more networks 120 through the satellite system 105 and the gateway 115.

The satellite system 105 may include one or more satellites. The one or more satellites in the satellite system 105 may include any suitable type of communication satellite. In some examples, some or all of the satellites may be in geosynchronous or geostationary earth orbit (GEO). In other examples, any appropriate orbit (e.g., medium earth orbit (MEO), low earth orbit (LEO), etc.) for satellite system 105 may be used. Some or all of the satellites of satellite system 105 may be multi-beam satellites configured to provide service for multiple service beam coverage areas in a predefined geographical service area.

The gateway antenna system 110 may be two-way capable and designed with adequate transmit power and receive sensitivity to communicate reliably with the satellite system 105. The satellite system 105 may communicate with the gateway antenna system 110 by sending and receiving signals through one or more beams 160. The gateway 115 sends and receives signals to and from the satellite system 105 using the gateway antenna system 110. The gateway 115 may be connected to the one or more networks 120. The networks 120 may include a local area network (LAN), metropolitan area network (MAN), wide area network (WAN), or any other suitable public or private network and may be connected to other communications networks such as the Internet, telephony networks (e.g., Public Switched Telephone Network (PSTN), etc.), and the like.

The aircraft 130 includes an on-board communication system including a satellite terminal 140, including an antenna, which may be an antenna array. The aircraft 130 may use an antenna 145 of the satellite terminal 140 to communicate with the satellite system 105 over one or more beams 150. The satellite terminal 140 may be mounted on the outside of the fuselage or other location on the exterior of aircraft 130 under a radome 135, as illustrated for aircraft 130 in FIG. 1. In other examples, other types of housings may be used to house satellite terminal 140. The antenna 145 of satellite terminal 140 may operate in the International Telecommunications Union (ITU) Ku, K, or Ka-bands. Alternatively, the antenna of satellite terminal 140 may operate in other frequency bands such as C-band, X-band, S-band, L-band, and the like.

Data sent over the downlink and uplink to the satellite system 105 over the one or more beams 150 may be formatted using a modulation and coding scheme (MCS) that may be custom to the satellite or similar to others in the industry. For example, the MCS may include multiple code-points that each are associated with a modulation technique (e.g., BPSK, QPSK, 16QAM, 64QAM, 256QAM, etc.) and a coding rate that is based on the ratio of the coded information bits to the total coded bits including redundant information.

The on-board communication system of the aircraft 130 may provide communication services for communication devices of the aircraft 130 via a modem 170. Communication devices may connect to and access the networks 120 through modem 170. Mobile and other devices within the aircraft 130 may communicate with one or more networks 120 via network connections to modem 170, which may be wired or wireless. A wireless connection may be, for example, of a wireless local area network (WLAN) technology such as IEEE 802.11 (Wi-Fi), or other wireless communication technology.

Figure 2:
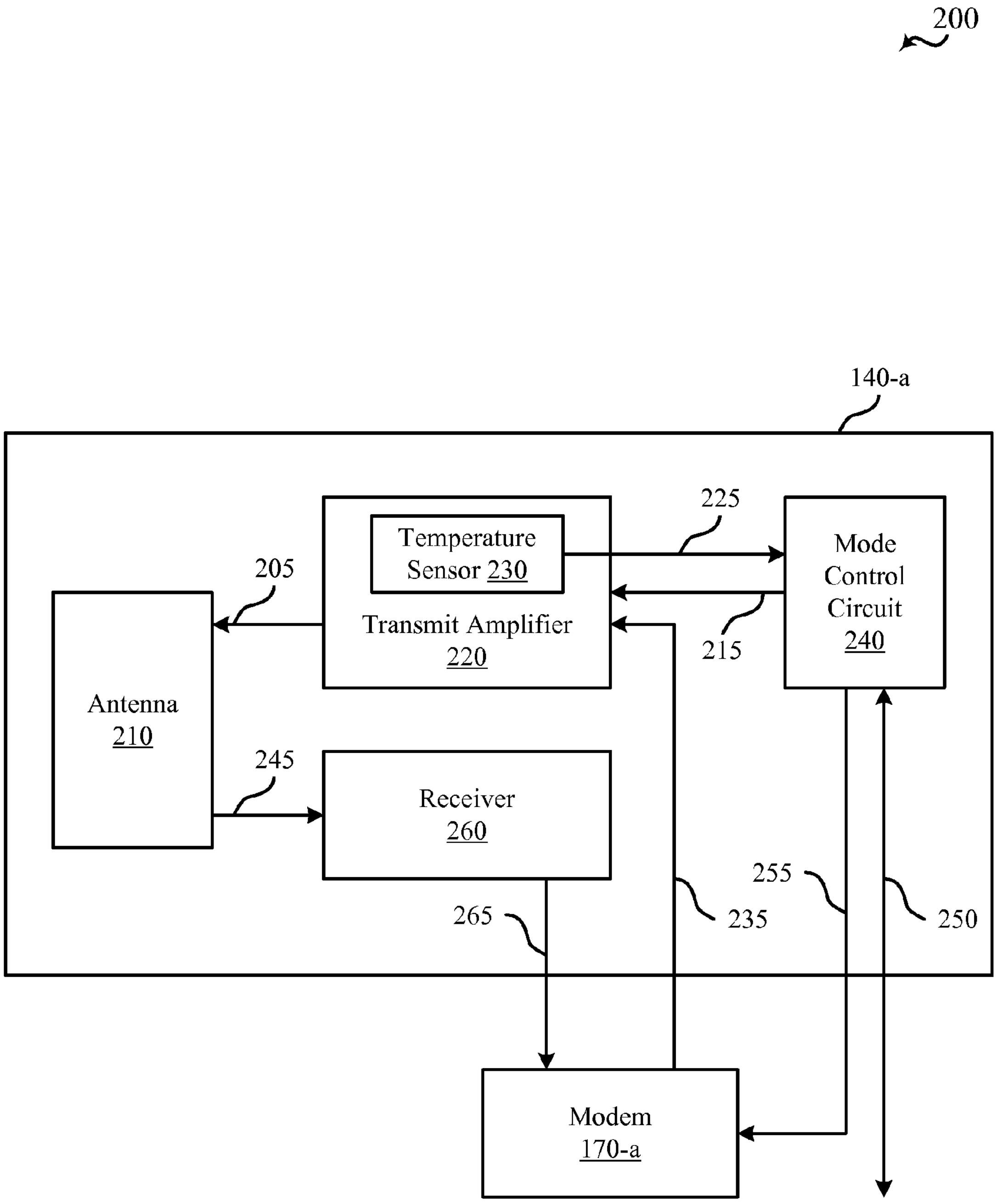
FIG. 2 shows a block diagram of an exemplary satellite terminal, in accordance with various aspects of the present disclosure.

FIG. 2 shows a block diagram 200 of an exemplary satellite terminal 140-a, in accordance with various aspects of the present disclosure. Satellite terminal 140-a may be an example of the satellite terminal 140 of FIG. 1. Satellite terminal 140-a includes at least an antenna 210, a transmit amplifier 220 to which is coupled with a temperature sensor 230, and a mode control circuit 240. Satellite terminal 140-a may also include additional components or systems not illustrated, e.g. antenna control circuits, power supplies, other electronics to facilitate communication, or communication interfaces.

Antenna 210 may be one of a variety of antennas suitable for transmission on a communication link from satellite terminal 140-a to a satellite of a satellite communications system, and may include one or more antenna elements. As described above, the antenna 210 may operate in one or more of the ITU Ku, K, or Ka-bands, or other frequency bands such as C-band, X-band, S-band, L-band, and the like. Antenna 210 may be mounted to or include a positioning apparatus which points the antenna, e.g. actively tracking, a satellite, for example satellite 125 of satellite system 105 as illustrated in FIG. 1. The positioning apparatus for the antenna may be a two-axis mechanical positioner, e.g. an elevation-over-azimuth (EL/AZ) antenna positioner. In other examples, the antenna positioner may point or steer the antenna system according to other mechanisms.

Satellite terminal 140-a also includes a transmit amplifier 220, to which is coupled a temperature sensor 230. The transmit amplifier 220 receives a transmit signal 235, e.g. from the modem 170-a of the communications system, to be sent to antenna 210 as amplified signal 205 on a communication link for transmission from the antenna 210. The transmit signal 235 may be provided from the modem 170-a as a radio frequency (RF) signal. As another example, the transmit signal 235 provided from the modem 170-a may be a baseband signal or an intermediate frequency (IF) signal, which is then upconverted to an RF signal by a component such as a mixer (not shown) within the transmit amplifier 220 or other electronics of the satellite terminal 140-a.

Antenna 210 may receive a signal wave, for example from a satellite, and provide a received RF signal 245 to a receiver 260. Receiver 260 then outputs a receive signal 265 to modem 170-a based on the received RF signal. In one example, receive signal 265 may be an IF or baseband signal. Receiver 260 may use electronics to amplify and downconvert the received RF signal 245 to generate the IF or baseband signal. Such electronics may include at least a low noise amplifier (LNA) and a mixer.

Transmit amplifier 220 may operate in a number of different power modes according to a power mode control signal 215 received from the mode control circuit 240. In a normal power mode, the power level of the amplified signal 205 output from transmit amplifier 220 has a first power level. In a reduced power mode, the power level of the amplified signal 205 output from the transmit amplifier is reduced relative to the power level of the amplified signal 205 output from the transmit amplifier 220 in the normal power mode to reduce the operating temperature of the transmit amplifier 220.

The power mode indicated by the power mode control signal 215 is based at least in part on a temperature signal 225 indicating the temperature of the transmit amplifier 220. The power mode control signal 215 may switch the transmit amplifier 220 from operating in a normal power mode, where the transmit signal 235 received from the modem 170-a is amplified at a normal power level, to a reduced power mode, where the transmit signal 235 is amplified at a reduced power level, and vice versa. Transmit amplifier 220 may also operate in more than two different low power modes under the control of the mode control circuit 240, e.g. based at least in part on a number of temperature thresholds.

Temperature sensor 230 is coupled to the transmit amplifier 220 to sense the temperature of the transmit amplifier 220 during operation. Temperature sensor 230 may include, for example, a thermistor, a thermocouple, a resistance thermometer, a silicon bandgap temperature sensor, or another device suitable to measure temperature over a range of temperatures that may exceed or be equal to the expected operating temperature of the satellite terminal 140-a. For example, the expected operating temperature range for the satellite terminal 140-a may be −55° C. to 50° C., such that the temperature sensor 230 should provide repeatable and reasonably accurate temperature measurements over at least this range. The temperature sensor 230 may be mounted to a housing of the transmit amplifier 220, fixed to one or more of the components of the transmit amplifier 220, or be integral with a component of the transmit amplifier 220. Temperature sensor 230 may include a circuit used to provide temperature signal 225 for the particular temperature sensor device. For example, the circuit may output a signal representing a junction voltage reading for a thermocouple. In other configurations, more than one temperature sensor may be used, such that a temperature signal or value may be calculated from the multiple temperature sensors, for example by taking an average value of the temperatures determined from the temperature sensors.

Mode control circuit 240 may provide the power mode control signal 215 to the transmit amplifier 220 to specify the operating mode in which the transmit amplifier 220 should operate. Mode control circuit 240 may also receive temperature signal 225 output from the temperature sensor 230 on which the mode control circuit 240 bases the value of the power mode control signal 215 used to specify the operating mode of the transmit amplifier 220. Mode control circuit 240 may be in communication with other components of the communications system via communication link 250, including to provide a signal indicative of the current operating mode of the transmit amplifier 220 of the terminal to other components of the communications system. Temperature threshold values may be sent by other components of the on-board communication system to the mode control circuit 240 via communication link 250 to set or update the temperature threshold values used by mode control circuit 240. Mode control circuit 240 can also provide an operating mode signal, indicative of the current operating mode of the transmit amplifier 220, to modem 170-a via communication link 255.

To determine an operating mode in which the transmit amplifier 220 operates, mode control circuit 240 compares the temperature signal 225 output from the temperature sensor 230 against one or more temperature threshold values. As a result of the comparison—and as further discussed below with reference to FIGS. 10A-10C—transmit amplifier 220 may switch operating modes, for example from a normal power mode to a reduced power mode based on the temperature threshold values.

Mode control circuit 240 may store a number of temperature threshold values for the transmit amplifier 220. For example, mode control circuit 240 may be programmed with a maximum safe operating temperature of the transmit amplifier and/or a minimum safe operating temperature of the transmit amplifier 220. The mode control circuit 240 may shut off the transmit amplifier 220 if the maximum or minimum safe operating temperature thresholds are exceeded, or turn the transmit amplifier 220 back on when the sensed temperature returns to a safe operating temperature.

Mode control circuit 240 may also store a first threshold for the transmit amplifier 220 to switch from a normal power mode to a reduced power mode, and/or a second threshold (which may be different than the first threshold) for the transmit amplifier 220 to switch back to the normal power mode from the reduced power mode. The first threshold may be used to trigger switching from the normal power mode to the reduced power mode as the sensed temperature rises above the first threshold. The second threshold may be used to trigger switching from the reduced power mode to the normal power mode as the sensed temperature falls below the second threshold. The second threshold may be used to provide hysteresis to prevent oscillation or ringing near the switching threshold, i.e. continual switching between power modes as the temperature quickly rises past the threshold for normal power then falls back below the threshold for reduced power. For example, the first temperature threshold may be set at 30° C. and the second temperature may be set at 25° C. The first and second thresholds may also be set to the same temperature value.

The mode control circuit 240 may also store a third threshold, representing a temperature threshold higher than the first threshold and a fourth threshold, representing a temperature threshold lower than the second threshold. Such additional thresholds may be used to further reduce the power level of the amplified signal 205 output from the transmit amplifier 220 at even higher operating temperatures. Like the first and second thresholds, the third threshold may be used alone to provide a trigger for switching from the reduced power mode to the further reduced power mode, while the fourth threshold may be used to provide hysteresis for the switching between the further reduced power mode and the reduced power mode. The third and fourth thresholds may also be set to the same temperature value.

The mode control circuit 240-a, including mode control circuit 240 described with reference to FIG. 2, may switch operation of the transmit amplifier 220 using a variety of techniques that reduce the heat dissipation in the transmit amplifier 220-e. As discussed below with reference to FIGS. 3-6, the mode control circuit 240-a may change bias conditions of the transmit amplifier 220 to reduce power consumption, and thus heat dissipation, within the transmit amplifier 220. A second way to reduce heat dissipation, as further discussed below, is to reduce the duty cycle of the transmit amplifier 220. A third way to reduce heat dissipation, also discussed below, is to reduce the bandwidth of the amplified signal. One or more these techniques may be used together, in some cases. Using one or more of these techniques may reduce a data rate (e.g., in bits-per-second) carried by the transmitted signal wave. For example, the MCS used for data transmissions may depend on the transmit power level, and closed-loop power control may be used to adjust the MCS or the transmit power level based on the signal received at the satellite.

In some examples of the satellite terminal 140-a, the transmit amplifier 220 operates in a pulsed or burst operation mode. For example, the transmit amplifier may transmit data in transmit burst periods over one or more carriers, which are typically allocated to the satellite terminal 140-a (e.g., time division multiple access (TDMA), etc.). The effective data rate may include a data rate for each transmitted burst multiplied by a duty cycle of the transmitted data bursts.

In some examples of the second way to reduce heat dissipation, the mode control circuit 240 may reduce the duty cycle of pulsed or burst operation to increase the amount of cooling time between transmit bursts. Reducing the duty cycle while maintaining the same data rate during data bursts reduces the overall power dissipated by transmit amplifier 220. Decreasing the duty cycle when in the reduced power mode decreases the average power in amplified signal output by the transmit amplifier, which in turn reduces the dissipated heat, and therefore overall temperature, of the transmit amplifier 220. Reducing the duty cycle may also be implemented when the duty cycle is 100% in the normal power mode.

The mode control circuit 240 may also signal the modem 170-a to reduce the dissipated power in the transmit amplifier 220 and the modem 170-a may reduce the dissipated power in a variety of ways. For example, the modem 170-a may reduce the duty cycle of the transmit amplifier 220 by requesting fewer data bursts to be allocated to the satellite terminal 140-a or using less than all allocated data bursts, lowering the overall heat dissipation of the transmit amplifier 220. In other examples, the modem 170-a may reduce the transmit power bandwidth (e.g., using a subset of allocated carriers) for the allocated data bursts. In other examples, the modem 170-a may encode the transmit signal 235 to be amplified by the transmit amplifier 220 according to a different MCS in a reduced power mode relative to a normal power mode. For example, where a particular MCS (e.g., 64QAM) is in use for a normal power mode, a new MCS (e.g., 16QAM) that is a next step down the in MCS signal quality range may be selected for use in the reduced power mode. In some cases, reducing the data rate of the MCS may effectively lower the transmit power because of the closed-loop power control. For example, the signal wave using the new MCS may be detected at the satellite and decoded with a bit error rate (BER) or block error rate (BLER) higher than a target and the satellite may indicate to the satellite terminal 140-a to reduce transmit power as part of the closed-loop power control. The modem 170-a may implement the power reduction in multiple steps. For example, the modem 170-a may continue to periodically reduce the MCS by one step at a time as long as the mode control circuit 240 indicates that the transmit power should be reduced.

Figure 3:
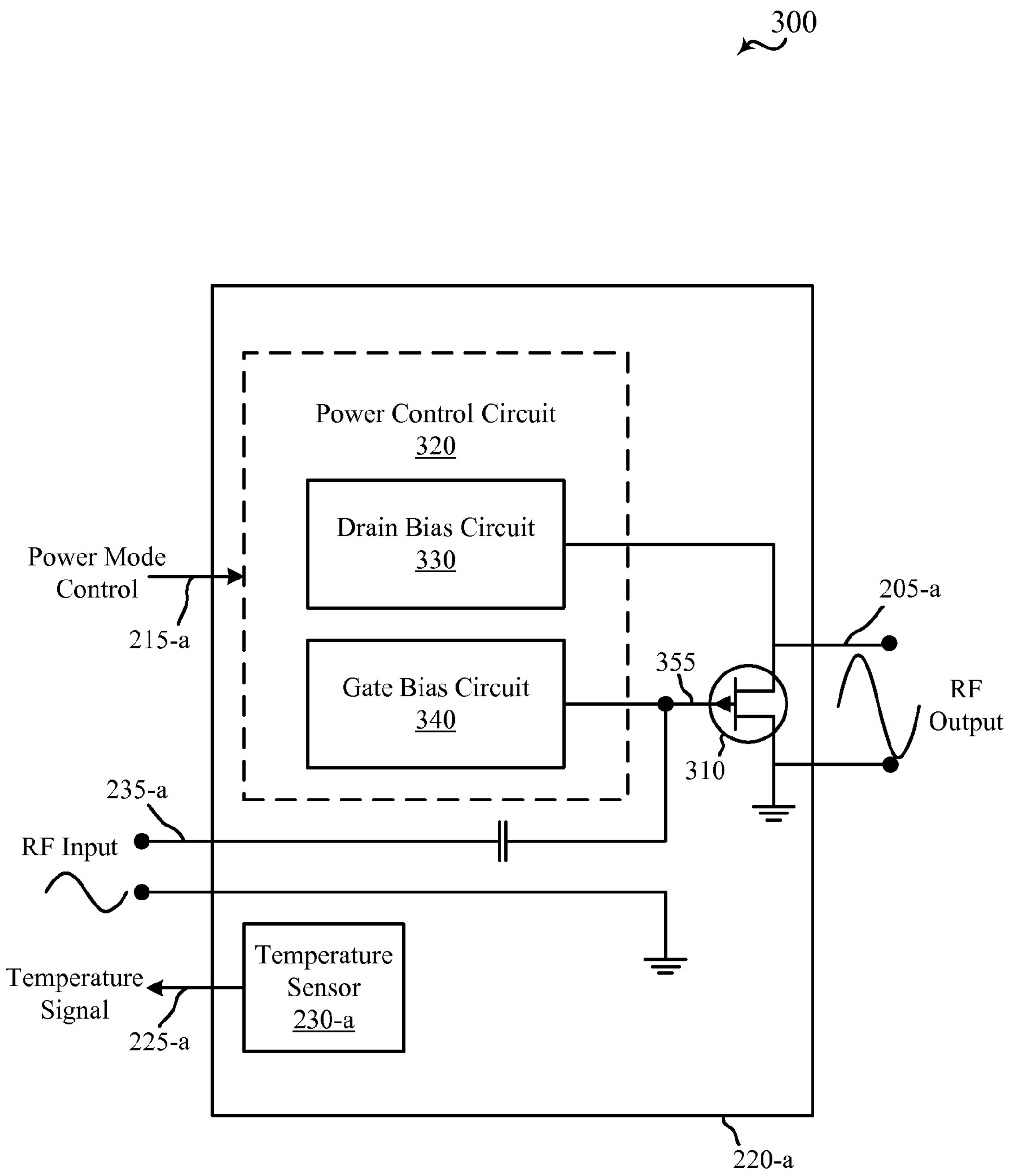
FIG. 3 shows a block diagram of an exemplary transmit amplifier, in accordance with various aspects of the present disclosure.

FIG. 3 shows a block diagram 300 of an exemplary transmit amplifier 220-a, in accordance with various aspects of the present disclosure. Transmit amplifier 220-a may be an example of the transmit amplifier 220 of FIG. 2. Transmit amplifier 220-a may take an RF input signal 235-a and output an amplified RF signal 205-a. The RF input signal 235-a and amplified RF signal 205-a may be, for example, the transmit signal 235 and amplified signal 205 of FIG. 2, respectively. For ease of understanding the power control circuit, FIG. 3 (and FIGS. 4-6 below) illustrates only simplified RF input and output portions of transmit amplifier 220, omitting various circuit elements that may otherwise be present in an RF amplifier. Transmit amplifier 220 includes at least a transistor 310, a power control circuit 320, and a temperature sensor 230-a. Temperature sensor 230-a may be one or more of the temperature sensors 230 of FIG. 2, which provides a temperature signal 225-a to the mode control circuit 240 or other components of the communications system.

Transistor 310 may be any of a variety of suitable RF transistors that can amplify a signal in the frequency bandwidth needed to transmit amplified RF signal 205-a from the antenna. Transistor 310 may be, for example, a high-power microwave field-effect transistor (FET) or monolithic microwave integrated circuit (MMIC), or any number of similar solid-state semiconductor or compound semiconductor transistor devices, and may be p-type or n-type.

Where transistor 310 is a FET, it may comprise at least a gate, source, and drain. For purposes of the present disclosure, FETs are discussed with respect to their gate, source, and drain, and applying biases and/or voltages to these terminals using circuits of the power control circuit 320, as further described below. However, it is appreciated that in other examples transistor 310 may also be a bipolar junction transistor (BJT) or related bipolar transistor devices, and may be PNP-type or NPN-type devices. In the case of a BJT, the corresponding terminals to the gate, source, and drain are a base, collector, and emitter, such the various circuits of power control circuit 320 may bias the base, collector, and/or emitter of a BJT instead of the gate, source, and/or drain of a FET or MMIC.

Power control circuit 320 includes drain bias circuit 330 and gate bias circuit 340 to apply biases to the gate and drain of transistor 310. The source of transistor 310, which in this example is an n-type transistor device, may be tied to ground. However, other configurations are possible (e.g., p-type transistors, source follower, emitter degeneration, multi-stage amplifier, etc.) using the principles described herein. As further described below, drain bias circuit 330 may apply a drain bias condition (e.g., bias current, bias voltage, etc.) to the drain of transistor 310, while gate bias circuit 340 may apply a gate bias voltage 355 to the gate of transistor 310. Power control circuit 320 is responsive to power mode control signal 215-a, which may control the one or both of the drain bias circuit 330 and gate bias circuit 340 to bias the transistor 310 in a variety of power modes, including at least one normal power mode and one reduced power mode as further described below.

Figure 4:
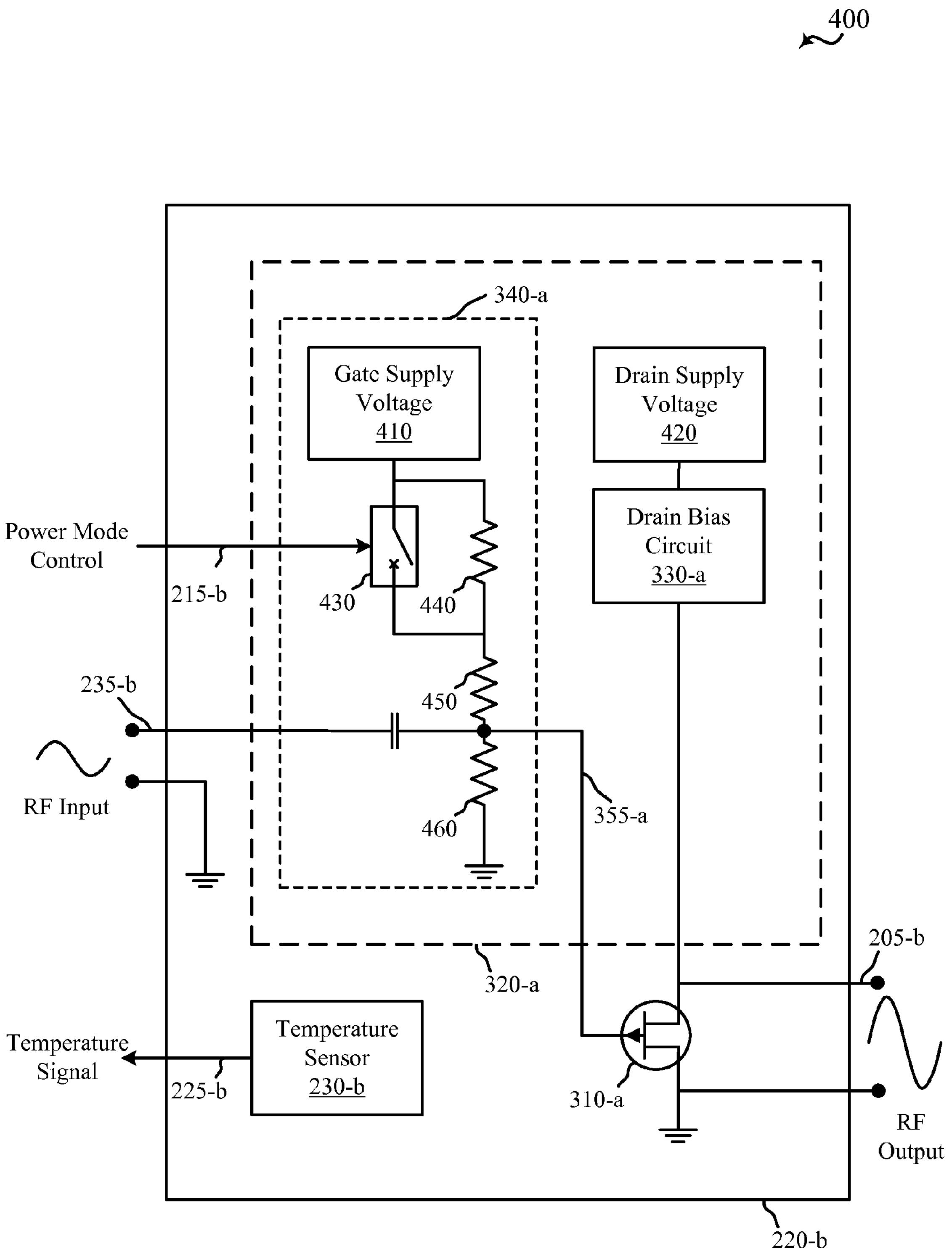
FIG. 4 shows a first block diagram of an exemplary transmit amplifier of a satellite terminal, in accordance with various aspects of the present disclosure.

FIG. 4 shows a first block diagram 400 of an exemplary transmit amplifier 220-b of a satellite terminal, in accordance with various aspects of the present disclosure. Transmit amplifier 220-b may be an example of the transmit amplifiers 220 of FIG. 2 or 3. Transmit amplifier 220-b may take an RF input signal 235-b and output an amplified RF signal 205-b. The RF input signal 235-b and amplified RF signal 205-b may be, for example, the transmit signal 235 and amplified transmit signal 205 of FIG. 2, respectively. Transmit amplifier 220-b includes at least a transistor 310-a, a power control circuit 320-a, and a temperature sensor 230-b, which may be examples of the, transistor 310, power control circuit 320 and/or temperature sensor 230 of FIGS. 2 and/or 3. Temperature sensor 230-b senses a temperature of the transmit amplifier 220-b and provides a temperature signal 225-b indicating the sensed temperature.

Transmit amplifier 220-b includes gate supply voltage 410 and drain supply voltage 420, which may be the same or different bias voltage sources. Drain bias circuit 330-a of power control circuit 320-a provides a drain bias condition (e.g., bias current, bias voltage, etc.) to the drain of transistor 310-a. Gate bias circuit 340-a of power control circuit 320-a provides a gate bias voltage 355-a to the gate of transistor 310-a under the control of the power mode control signal 215-b. Here, gate supply voltage 410 provides a static supply voltage. Power mode control signal 215-b is a binary signal to operate a switch 430 to control the gate bias circuit 340-a to provide a first bias voltage to close the switch 430 when in a normal power mode, and a second bias voltage to open the switch when in a reduced power mode. The values of the resistors 440, 450, and 460 that form the voltage divider may be selected to adjust the gate bias voltage 355-a in each of the power modes according to the open or closed position of switch 430. Adjusting the gate bias voltage 355-a changes bias conditions (e.g., transconductance, etc.) to change the gain of the transistor 310-a and thus change the power level of the amplified RF signal 205-b relative to the RF input signal 235-b. For example, the transistor 310-a may have a first transconductance when operated at the first bias voltage that results in a first power level for the amplified RF signal 205-b and a second, lower transconductance when operated at the second bias voltage that results in a second, lower power level for the amplified RF signal 205-b.

Figure 5:
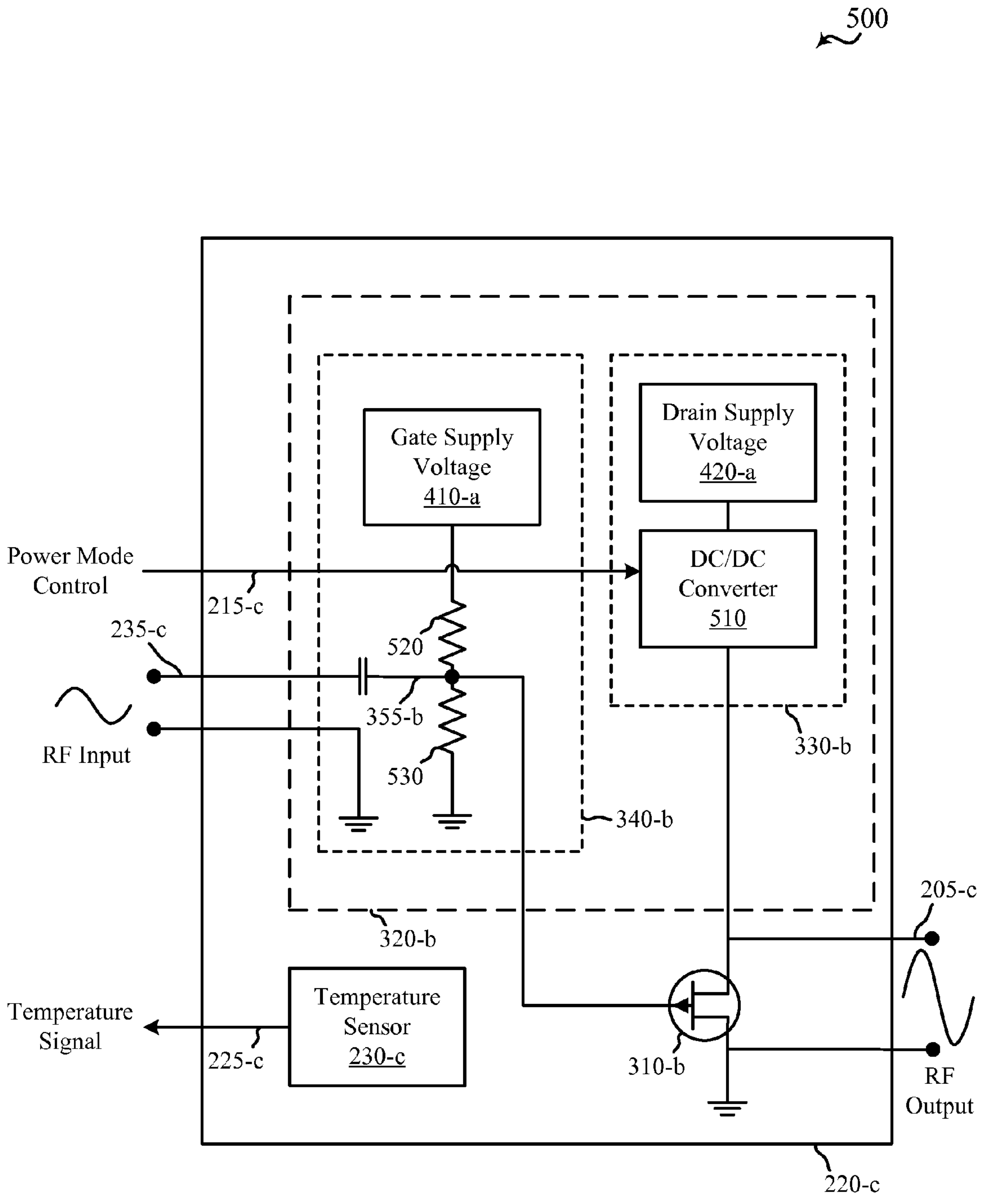
FIG. 5 shows a block diagram of a second exemplary transmit amplifier of a satellite terminal, in accordance with various aspects of the present disclosure.

FIG. 5 shows a block diagram 500 of a second exemplary transmit amplifier 220-c of a satellite terminal, in accordance with various aspects of the present disclosure. Transmit amplifier 220-c may be an example of the transmit amplifiers 220 of FIG. 2 or 3. Transmit amplifier 220-c may take an RF input signal 235-c and output an amplified RF signal 205-c. The RF input signal 235-c and amplified RF signal 205-c may be, for example, the transmit signal 235 and amplified signal 205 of FIG. 2, respectively. Transmit amplifier 220-c includes at least a transistor 310-b, a power control circuit 320-b, and a temperature sensor 230-c, which may be examples of the, transistor 310, power control circuit 320 and/or temperature sensor 230 of FIGS. 2 and/or 3. Temperature sensor 230-c senses a temperature of the transmit amplifier 220-c and provides a temperature signal 225-c.

Transmit amplifier 220-c includes gate supply voltage 410-a and drain supply voltage 420-a, which may have the same or a different value. Gate bias circuit 340-b of power control circuit 320-b provides a bias to the gate of transistor 310-b using a voltage divider formed by resistors 520 and 530. The values of the resistors 520 and 530 may be selected to adjust the gate bias voltage 355-b applied to the gate of transistor 310-b.

Drain bias circuit 330-b of power control circuit 320-b provides a drain bias voltage to the drain of transistor 310-b under the control of the power mode control signal 215-c. A direct-current to direct-current (DC/DC) converter 510 may output a voltage used to bias (e.g., via an output resistance, etc.) the drain of transistor 310-b that is adjustable by the power mode control signal 215-c. DC/DC converter 510 may be of any number of adjustable designs sufficient to provide a voltage to bias the drain according to the power mode control signal 215-c using the drain supply voltage 420. Changing the drain bias voltage changes the power level of the amplified RF signal 205-b by changing the output power of the amplified RF signal 205-b relative to the RF input signal 235-b. For example, a higher drain bias voltage results in a higher output at a given transconductance of the transistor 310-b (e.g., lower equivalent output resistance, etc.).

DC/DC converter 510 may be adjustable to supply a first output voltage to the transistor 310-b in a normal power mode indicated by the power mode control signal 215-c, and may be adjustable to supply a reduced output voltage to the transistor 310-b in a reduced power mode indicated by the power mode control signal 215-c. In some examples, power mode control signal 215-c may specify two output voltages, a first voltage in a normal power mode, and a reduced voltage in a reduced power mode.

In other examples, power mode control signal 215-c may specify three or more output voltages, a first voltage in a normal power mode, a reduced voltage in a reduced power mode, a further reduced voltage in a further reduced power mode, etc. As described in further detail above, each power mode may be triggered at different temperature thresholds, according to a value of a temperature signal 225-c obtained from temperature sensor 230-c, which is affixed, mounted, or otherwise thermally coupled to transmit amplifier 220-c.

In still other examples, DC/DC converter 510 may function to provide a continuously variable voltage output over a range of voltages, such that power mode control signal 215-c may adjust the output voltage of DC/DC converter 510 applied to the drain linearly as a function of the temperature of the transmit amplifier over a range of sensed temperature signal 225-c between two temperature thresholds. For example, drain bias voltage may be set by the power mode control signal 215-c to twelve (12) volts at a 30° C. temperature threshold and set to eight (8) volts at a 50° C. temperature threshold, where the power mode control signal 215-c continually adjusts down the DC/DC converter 510 to decrease its output from twelve (12) volts to eight (8) volts from 30° C. and 50° C. Such decreasing may also be discontinuous, but in a multitude of small steps.

Figure 6:
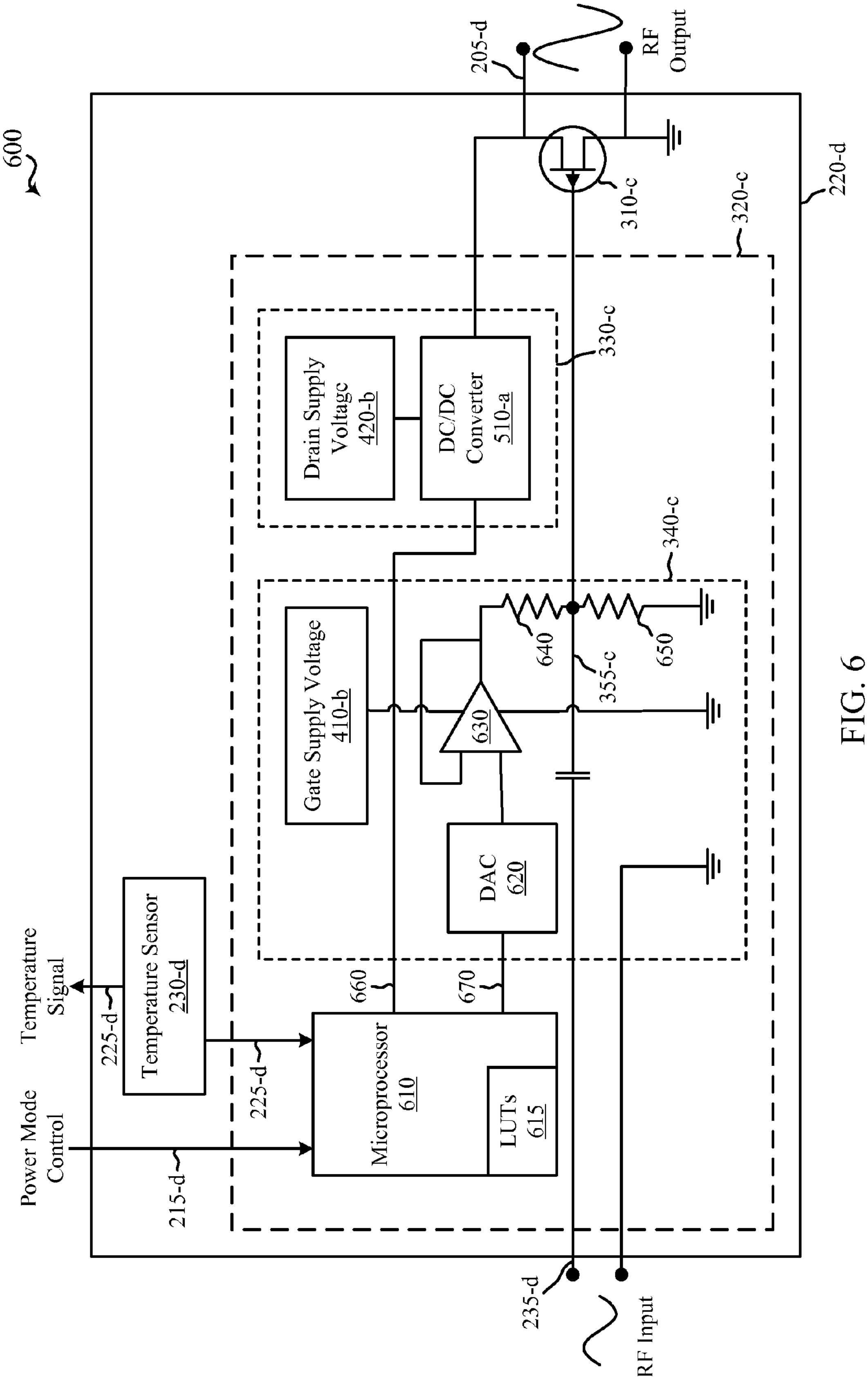
FIG. 6 shows a block diagram of a third exemplary transmit amplifier of a satellite terminal, in accordance with various aspects of the present disclosure.

FIG. 6 shows a block diagram 600 of a third exemplary transmit amplifier 220 of a satellite terminal, in accordance with various aspects of the present disclosure. Transmit amplifier 220-d may be an example of the transmit amplifiers 220 of FIG. 2 or 3. Transmit amplifier 220-d may take an RF input signal 235-d and output an amplified RF signal 205-d. The RF input signal 235-d and amplified RF signal 205-d may be, for example, the transmit signal 235 and amplified signal 205 of FIG. 2, respectively. Transmit amplifier 220-d includes at least a transistor 310-c, a power control circuit 320-c, and a temperature sensor 230-d to provide a temperature signal, including temperature signal 225-d, which may be examples of the, transistor 310, power control circuit 320 and/or temperature sensor 230 of FIGS. 2 and/or 3.

Power control circuit 320-c includes a microprocessor 610 to provide a control output 660 to DC/DC converter 510-a to control the drain bias voltage for transistor 310-c and to provide a control output 670 to a digital-to analog converter (DAC) 620 to control the gate bias voltage for transistor 310-c. Microprocessor 610 receives as inputs a power mode control signal 215-d and a temperature signal 225-d, which signal may be received from temperature sensor 230-d and reflect a sensed temperature of the transmit amplifier.

Microprocessor 610 may include a number of look-up tables (LUTs) 615 that may be programmed to store gate bias values and drain bias values corresponding to particular power modes. For example, the LUTs may store data for drain bias values and gate bias values determined experimentally prior to deploying the transmit amplifier on an aircraft, e.g. while the satellite terminal is on the ground. Thus, the power mode control signal 215-d may signal to microprocessor 610 to provide bias values for a particular mode.

Drain bias circuit 330-c of power control circuit 320-c provides a drain bias voltage to the drain of transistor 310-c under the control of the microprocessor 610. DC/DC converter 510-a may output a voltage to the drain of transistor 310-b that is adjustable according to an input, which here is an output from a microprocessor 610. DC/DC converter 510-a may be of any number of adjustable designs sufficient to provide a voltage to the drain, as discussed in greater detail above with respect to DC/DC converter 510 as shown in FIG. 5.

Gate bias circuit 340-c of power control circuit 320-c provides a gate bias voltage 355-c to the gate of transistor 310-c under the control of the microprocessor 610. Microprocessor 610 outputs control output 670 to a digital-to-analog converter 620 to translate the digital control output 670 to an analog signal that is input to an operational amplifier (op-amp) 630 configured as a buffer. Gate supply voltage 410-b provides the supply voltage of op-amp 630. The output of op-amp 630 supplies a voltage divider formed by resistors 640 and 650 to provide the gate bias voltage 355-c.

Thus, the gate bias and drain bias at transistor 310-c may be provided by, and adjusted to a number of various levels by, gate bias circuit 340-c and drain bias circuit 330-c, respectively, under the control of microprocessor 610.

Figure 7:
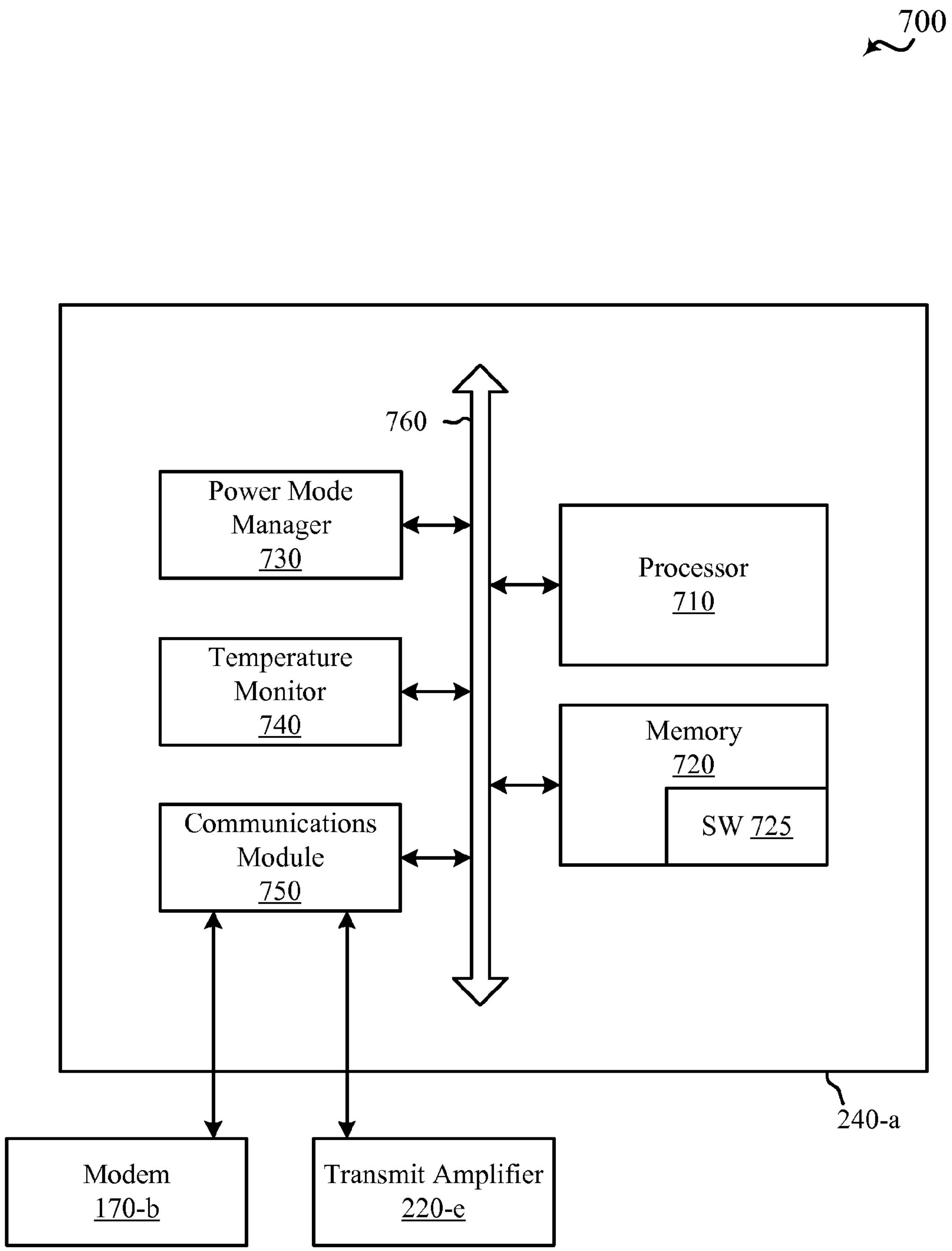
FIG. 7 shows a block diagram of a system including a mode control circuit configured to control a transmit amplifier, in accordance with various aspects of the present disclosure.

FIG. 7 shows a block diagram of a system 700 including mode control circuit 240-a configured to control a transmit amplifier 220-e in accordance with various aspects of the present disclosure. Mode control circuit 240-a may be an example of mode control circuit 240 described with reference to FIG. 2.

Mode control circuit 240-a may be communicatively coupled with transmit amplifier 220-e via communications module 750 to provide a mode control signal and/or receive a signal representing a temperature of the transmit amplifier 220-e as measured by one or more temperature sensors. Transmit amplifier 220-e may be an example of transmit amplifier 220 described with reference to FIGS. 2-6. Mode control circuit 240-a may also be communicatively coupled with a modem 170-b of the aircraft's communications system via communications module 750. Modem 170-b may be an example of a modem 170 described with reference to FIGS. 1-2.

Mode control circuit 240-a may include a power mode manager 730, a temperature monitor 740, and a communications module 750. Communications module 750 may provide a communications interface to modem 170-b and transmit amplifier 220-e, as described above, as well as other components of the aircraft, including the communications system. Temperature monitor 740 monitors the temperature of the transmit amplifier 220-e. Power mode manager 730 generates a mode control signal to control the power mode of the transmit amplifier 220-e, based at least in part on a measure temperature and various temperature thresholds, as described with reference to FIGS. 2-6, and elsewhere herein.

Mode control circuit 240-a may also include a processor 710, and memory 720 (including software (SW) 725). The memory 720 may include random access memory (RAM) and read only memory (ROM). The memory 720 may store computer-readable, computer-executable software/firmware code including instructions that, when executed, cause the processor 710 to perform various functions described herein (e.g., switching operation of the transmit amplifier between a normal power mode and one or more reduced power modes, monitoring the temperature of the transmit amplifier, etc.). The processor 710 may include an intelligent hardware device, (e.g., a central processing unit (CPU), a microcontroller, an application specific integrated circuit (ASIC), etc.). Each of the components of mode control circuit 240-a may be coupled with each other (e.g., via bus 760, etc.).

The components of the mode control circuit 240-a may be, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 8:
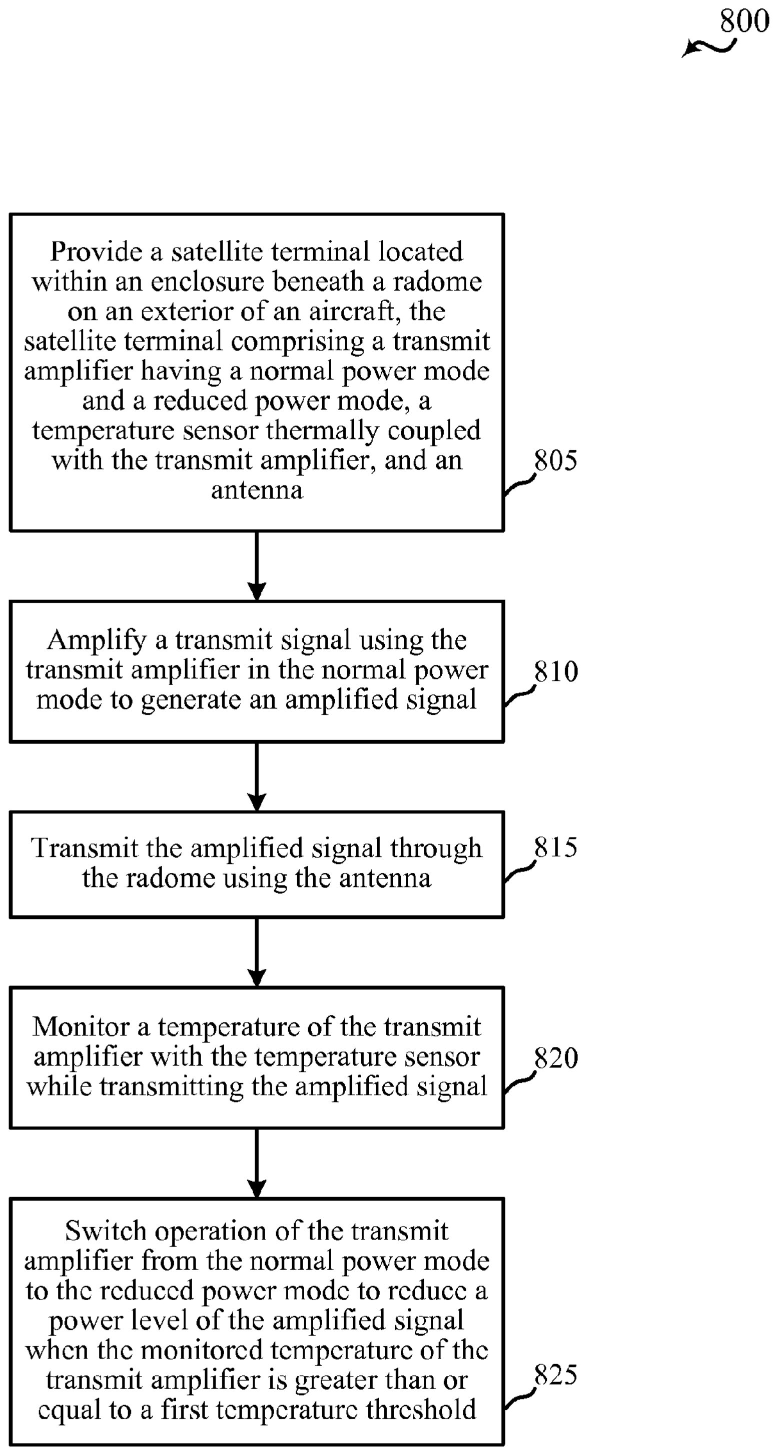
FIG. 8 is a flow chart illustrating a first example of a method, in accordance with various aspects of the present disclosure.

FIG. 8 is a flow chart illustrating a first example of a method 800, in accordance with various aspects of the present disclosure. For clarity, the method 800 may be described below with reference to aspects of one or more of the components of the satellite terminal 140 described with reference to FIGS. 1-7. In some examples, the satellite terminal may execute one or more instructions to perform the functions described below. Additionally or alternatively, the satellite terminal may perform one or more of the functions described below using special-purpose hardware.

At block 805, the method 800 may include providing a satellite terminal located within an enclosure beneath a radome on an exterior of an aircraft, the satellite terminal comprising a transmit amplifier having a normal power mode and a reduced power mode, a temperature sensor thermally coupled with the transmit amplifier, and an antenna. The satellite terminal may be in accord with one or more of satellite terminals 140 described with reference to FIGS. 1-2, within a radome on an exterior of an aircraft as illustrated with reference to aircraft 130 with radome 135. The transmit amplifier may be an example of the transmit amplifier 220 described with reference to FIGS. 2-7. The temperature sensor may be an example of the temperature sensor 230 described with reference to FIGS. 2-6. The antenna may be an example of the antenna 210 described with reference to FIG. 2.

At block 810, the method 800 may include amplifying a transmit signal using the transmit amplifier in the normal power mode to generate an amplified signal. Amplifying may be performed by one or more of transistors 310 described with reference to FIGS. 3-6.

At block 815, the method 800 may include amplifying a transmit signal using the transmit amplifier in the normal power mode to generate an amplified signal. Amplifying may be performed by one or more of transistors 310 described with reference to FIGS. 3-6.

At block 820, the method 800 may include monitoring a temperature of the transmit amplifier with the temperature sensor while transmitting the amplified signal. Monitoring may be performed by one or more of temperature sensors 230 described with reference to FIGS. 2-6, microprocessor 610 described with reference to FIG. 6, and temperature monitor 740 described with reference to FIG. 7.

At block 825, the method 800 may include switching operation of the transmit amplifier from the normal power mode to the reduced power mode to reduce a power level of the amplified signal when the monitored temperature of the transmit amplifier is greater than or equal to a first temperature threshold. Switching may be performed by one or more of mode control circuit 240 described with reference to FIGS. 2 and 7 and power mode manager 730 described with reference to FIG. 7.

Figure 9:
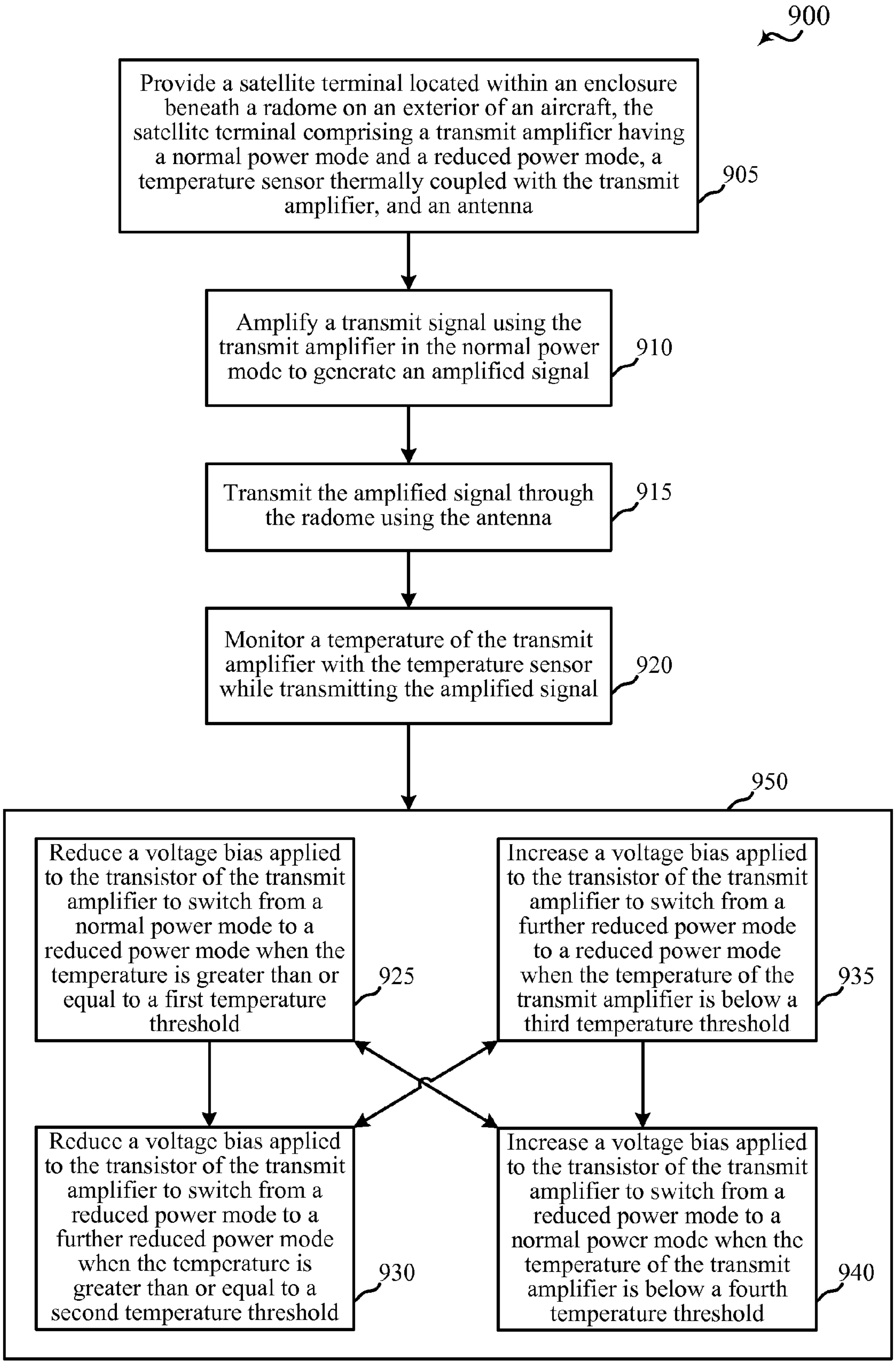
FIG. 9 is a flow chart illustrating a second example of a method, in accordance with various aspects of the present disclosure.

FIG. 9 is a flow chart illustrating a second example of a method 900, in accordance with various aspects of the present disclosure. For clarity, the method 900 may be described below with reference to aspects of one or more of the components of the terminal described with reference to FIGS. 1-7. In some examples, the terminal may execute one or more instructions to perform the functions described below. Additionally or alternatively, the terminal may perform one or more of the functions described below using special-purpose hardware.

At block 905, the method 900 may include providing a satellite terminal located within an enclosure beneath a radome on an exterior of an aircraft, the satellite terminal comprising a transmit amplifier having a normal power mode and a reduced power mode, a temperature sensor thermally coupled with the transmit amplifier, and an antenna. The terminal may be in accord with one or more of satellite terminal 140 described with reference to FIGS. 1-2, within a radome on an exterior of an aircraft as illustrated with reference to aircraft 130 with radome 135. The transmit amplifier may be in accord with one or more of transmit amplifier 220 described with reference to FIGS. 2-7. The temperature sensor may be in accord with one or more of temperature sensor 230 described with reference to FIGS. 2-6. The antenna may be in accord with one or more of antenna 210 described with reference to FIG. 2.

At block 910, the method 900 may include amplifying a transmit signal using the transmit amplifier in the normal power mode to generate an amplified signal. Amplifying may be performed by one or more of transistor 310 described with reference to FIGS. 3-6.

At block 915, the method 900 may include transmitting the amplified signal through the radome using the antenna. Transmitting may be performed by one or more of antenna 210 described with reference to FIG. 3.

At block 920, the method 900 may include monitor a temperature of the transmit amplifier with the temperature sensor while transmitting the amplified signal. Monitoring may be performed by one or more of temperature sensor 230 described with reference to FIGS. 2-6, microprocessor 610 described with reference to FIG. 6, and temperature monitor 740 described with reference to FIG. 7.

At block 950, the method 900 may include blocks 925, 930, 935, and 940. Depending on the monitored temperature of the transmit amplifier and the current power mode in which the transmit amplifier is operating, e.g. a normal power mode, a reduced power mode, a further reduced power mode, etc., the method may proceed to one of blocks 925, 930, 935, and 940 from block 920. The method may also proceed between these blocks depending on changes in the monitored temperature and the current power mode, e.g. the method may go from block 925 to block 940 as the temperature decreases below the fourth temperature threshold, or from block 935 to block 930 as the temperature increases past the second temperature threshold.

At block 925, the method 900 may include reducing a voltage bias applied to the transistor of the transmit amplifier to switch from a normal power mode to a reduced power mode when the temperature is greater than or equal to a first temperature threshold.

At block 930, the method 900 may include reducing a voltage bias applied to the transistor of the transmit amplifier to switch from a reduced power mode to a further reduced power mode when the temperature is greater than or equal to a second temperature threshold.

At block 935, the method 900 may include increasing a voltage bias applied to the transistor of the transmit amplifier to switch from a further reduced power mode to a reduced power mode when the temperature of the transmit amplifier is below a third temperature threshold.

At block 940, the method 900 may include increasing a voltage bias applied to the transistor of the transmit amplifier to switch from a reduced power mode to a normal power mode when the temperature of the transmit amplifier is below a fourth temperature threshold.

Reducing and/or increasing the voltage bias as described with reference to blocks 925, 930, 935, and 940 may be performed by one or more of drain bias circuit 330 and/or gate bias circuit 340 in response to the power mode control signal 215 described with reference to FIGS. 3-6, including the microprocessor 610 described with reference to FIG. 6.

In some examples, aspects from two or more of method 800 and method 900 may be combined. It should be noted that the method 800 and method 900 are just example implementations, and that the operations of the method 800 and method 900 may be rearranged or otherwise modified such that other implementations are possible.

Figure 10A:
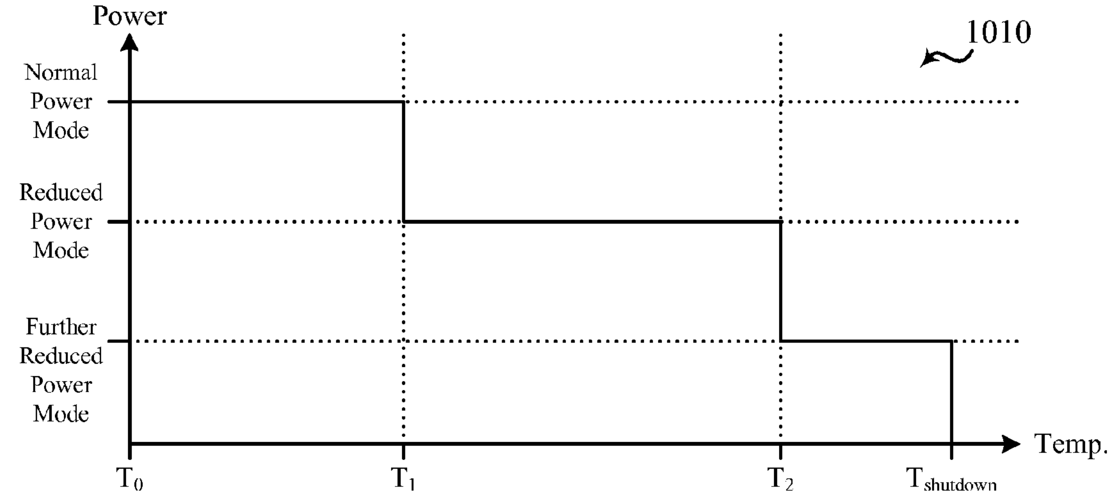
FIGS. 10A-10C are graphs illustrating output power of a transmit amplifier in various power modes, in accordance with various aspects of the present disclosure.
Figure 10B:
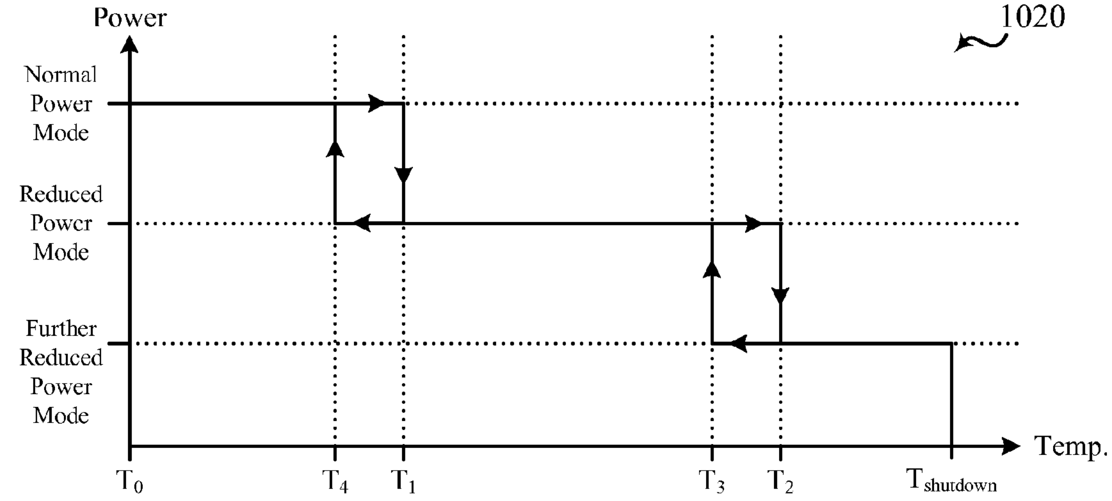
Figure 10C:
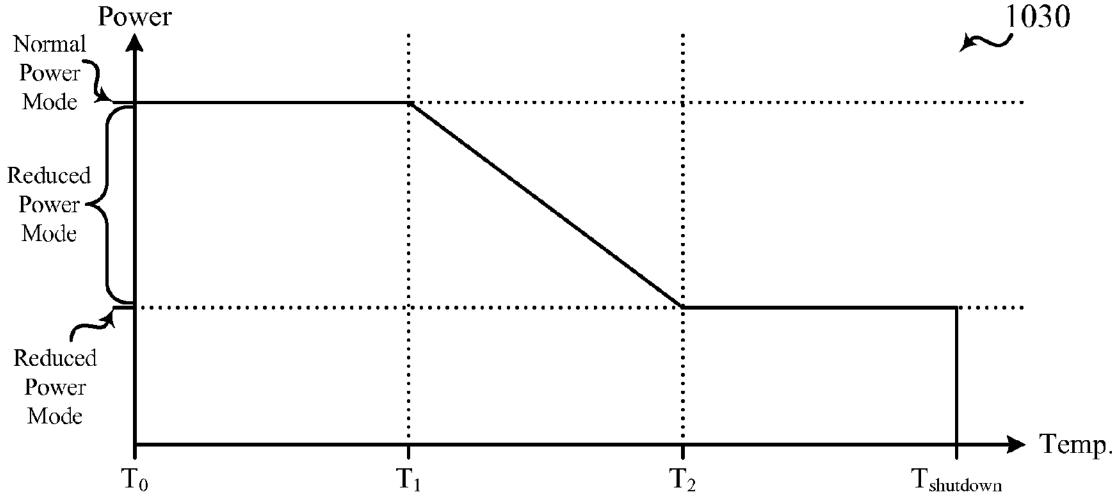

FIGS. 10A-10C are graphs illustrating output power of a transmit amplifier in various power modes. The graphs show the amplification power of the transmit amplifier on its vertical axis as a function of the temperature of the transmit amplifier as sensed by a temperature sensor thermally coupled with the transmit amplifier. The transmit amplifier may be in accord with one or more of transmit amplifier 220 described with reference to FIGS. 2-7. The temperature sensor may be in accord with one or more of temperature sensor 230 described with reference to FIGS. 2-6. The transmit amplifier is operating in one of several power modes, which may include: a normal power mode, a reduced power mode, a further reduced power mode, and shutdown mode. The transmit amplifier may be controlled in these power modes by one or more of mode control circuit 240 described with reference to FIGS. 2 and 7 and power mode manager 730 described with reference to FIG. 7. The power reduction for the reduced power mode and further reduced power modes may be achieved in a variety of ways. For example, the transmit amplifier gain may be reduced, the data rate may be reduced, or the transmit frequency bandwidth may be reduced. The transmit amplifier gain may be reduced by modifying, transistor voltage biases within the transmit amplifier, as further described with reference to FIGS. 3-6.

FIG. 10A is a graph 1010 illustrating output power of a transmit amplifier in various power modes, in accordance with various aspects of the present disclosure. In this example, the transmit amplifier is operating in one of four power modes: a normal power mode, a reduced power mode, a further reduced power mode, and a shutdown mode. $T_0$ represents a baseline temperature of the transmit amplifier well within the operating range of the satellite terminal, e.g. 0° C. for an aircraft at a cruising altitude. $T_1$ represents a first temperature threshold and $T_2$ represents a second temperature threshold. These temperature thresholds may be predetermined based at least in part on experiments performed on the satellite terminal prior to its deployment on the aircraft. As illustrated by graph 1010, when the measured or sensed temperature of the transmit amplifier reaches the first temperature threshold, $T_1$, the power of transmit amplifier is controlled into a reduced power mode, and the power of the transmit amplifier is reduced for temperatures above $T_1$. If the temperature of the transmit amplifier continues to rise, e.g. because the aircraft has landed in a geographic location with high ambient temperatures and solar loading, for example Phoenix, Ariz. at noon in the summer, the measured or sensed temperature of the transmit amplifier may reach the second temperature threshold, $T_2$. The power of transmit amplifier is then controlled into a further reduced power mode, and the power of the transmit amplifier is further reduced for any temperatures above $T_2$. If the temperature of the transmit amplifier continues to rise, at a shutdown temperature, $T_{shutdown}$, the satellite terminal will be disabled to prevent damage to the components of the terminal.

As illustrated in graph 1010, as the temperature of the transmit amplifier decreases, the power mode may be incrementally switched back to a high power mode, i.e. from shutdown mode to the further reduced power mode to the reduced power mode, and then to the normal power mode.

FIG. 10B is a graph 1020 illustrating output power of a transmit amplifier in various power modes, in accordance with various aspects of the present disclosure. In this example, the transmit amplifier is operating in one of four power modes: a normal power mode, a reduced power mode, a further reduced power mode, and a shutdown mode. In this example, switching between modes exhibits hysteresis.

$T_0$ represents a baseline temperature of the transmit amplifier. $T_1$ represents a first temperature threshold that is for rising temperatures and $T_2$ represents a second temperature threshold that is for rising temperatures. $T_3$ represents a third temperature threshold that is for falling temperatures and $T_4$ represents a fourth temperature threshold that is for falling temperatures. These temperature thresholds may be predetermined based at least in part on experiments performed on the satellite terminal prior to its deployment on the aircraft.

As illustrated by graph 1020, when the measured or sensed temperature of the transmit amplifier reaches the first temperature threshold, $T_1$, the power of transmit amplifier is controlled into a reduced power mode, and the power of the transmit amplifier is reduced for temperatures above $T_1$. However, the temperature of the transmit amplifier may then reach a temperature between $T_1$ and $T_2$, but then begin to decrease, e.g. because the aircraft has moved into a different environment, the reduced power of the transmit amplifier is adequate to cool the transmit amplifier, or usage of the communications system has diminished, etc. As the temperature decreases, it may reach temperature $T_1$. However, instead of switching power modes at $T_1$, the transmit amplifier may continue to be controlled in a reduced power mode until the fourth temperature threshold $T_4$ is met. Once temperature threshold $T_4$ is met the transmit amplifier may then be switched to the normal power mode. As described above, hysteresis may prevent oscillation or ringing near the switching threshold.

As further illustrated by graph 1020, switching between the reduced power mode and the further reduced power may also depend on two temperature thresholds to introduce hysteresis: the second temperature threshold, $T_2$, and the third temperature threshold, $T_3$.

As discussed with reference to FIG. 10A, if the temperature of the transmit amplifier rises to a shutdown temperature, $T_{shutdown}$, the satellite terminal will be disabled to prevent damage to the components of the terminal.

FIG. 10C is a graph 1030 illustrating output power of a transmit amplifier in various power modes, in accordance with various aspects of the present disclosure. In this example, the transmit amplifier is operating in one of three power modes: a normal power mode, a reduced power mode, and a shutdown mode. In this example, the power of the transmit amplifier may be linearly reduced above a first temperature threshold.

$T_0$ represents a baseline temperature of the transmit amplifier. $T_1$ represents a first temperature threshold and $T_2$ represents a second temperature threshold. As further discussed above, these temperature thresholds may be predetermined.

As illustrated by graph 1030, the transmit amplifier operates in normal power mode for temperature up to the first temperature threshold, $T_1$. When the measured or sensed temperature of the transmit amplifier reaches the first temperature threshold, $T_1$, the power of transmit amplifier is controlled to linearly reduce power of the transmit amplifier so that the reduction of power into the reduced power mode does not operate as a step to the reduced power mode. The linear reduction throughout the reduced power mode continues for temperatures falling between $T_1$ and $T_2$, and up to the second temperature threshold, $T_2$. The transmit amplifier may then operate at a constant power in the reduced power mode for temperatures above $T_2$ until $T_{shutdown}$. $T_2$ and $T_{shutdown}$ may also be the same value such that the transmit amplifier power is linearly reduced up to the shutdown temperature, at which point the transmit amplifier is turned off.

Although illustrated as a line, the linear reduction need not be so limited. The power mode control signal provided to the transmit amplifier may be analog or digital. Although illustrated as a line, the power mode control signal may be digital and may specify the reductions in power in a number of small steps, e.g. for an eight (8) bit power mode control signal, such that the output power is reduced in a number of small steps approximating a linear reduction. It should be noted that the linear reduction may approximate a linear function such that graph 1020 would illustrate an arc or curve rather than a straight line between $T_1$ and $T_2$.

As discussed with reference to FIGS. 10A and 10B, if the temperature of the transmit amplifier rises to a shutdown temperature, $T_{shutdown}$, the satellite terminal will be disabled to prevent damage to the components of the terminal.

In other examples, the mode control circuit may control the transmit amplifier according to a combination of the hysteresis described with reference to FIG. 10B and the linear reduction described with reference to FIG. 10C.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein, and in particular with respect to FIGS. 8 and 9, may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein, and in particular with respect to FIGS. 8 and 9, may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method, comprising:

providing a satellite terminal located within an enclosure beneath a radome on an exterior of an aircraft, the satellite terminal comprising a transmit amplifier having a normal power mode and a reduced power mode, a temperature sensor thermally coupled with the transmit amplifier, and an antenna;

amplifying a transmit signal using the transmit amplifier in the normal power mode to generate an amplified signal;

transmitting the amplified signal through the radome using the antenna;

monitoring a temperature of the transmit amplifier with the temperature sensor while transmitting the amplified signal; and switching operation of the transmit amplifier from the normal power mode to the reduced power mode to reduce a power level of the amplified signal when the monitored temperature of the transmit amplifier is greater than or equal to a first temperature threshold.

2. The method of claim 1, further comprising:

switching to a second reduced power mode when the temperature of the transmit amplifier is greater than or equal to a second temperature threshold greater than the first temperature threshold.

3. The method of claim 2, wherein the second temperature threshold comprises a maximum operational temperature of the transmit amplifier.

4. The method of claim 1, further comprising:

switching the satellite terminal from the reduced power mode to the normal power mode when the temperature of the transmit amplifier is below a second temperature threshold.

5. The method of claim 4, wherein the first temperature threshold is greater than the second temperature threshold.

6. The method of claim 4, wherein switching the satellite terminal from the reduced power mode to the normal power mode when the temperature of the transmit amplifier is below the second temperature threshold is based at least in part on an operating environment of the aircraft.

7. The method of claim 1, wherein the first temperature threshold is a predetermined number of degrees less than a maximum operational temperature of the transmit amplifier.

8. The method of claim 1, wherein the satellite terminal lacks an active cooling system.

9. The method of claim 1, wherein:

the transmit amplifier comprises a transistor; and switching from the normal power mode to the reduced power mode comprises reducing a voltage bias applied to the transistor from a first bias voltage to a reduced bias voltage.

10. The method of claim 9, wherein:

the transistor comprises a gate; and reducing the voltage bias of the transistor comprises reducing the voltage bias applied to the gate.

11. The method of claim 9, wherein:

the transistor comprises a drain; and reducing the voltage bias of the transistor comprises reducing the voltage bias applied to the drain.

12. The method of claim 9, wherein reducing the voltage bias applied to the transistor comprises decreasing the voltage bias applied to the transistor as a linear function of the temperature for a range of temperatures greater than the first temperature threshold when the temperature is greater than the first temperature threshold.

13. The method of claim 1, wherein the normal power mode comprises a pulsed operation of the transmit amplifier to generate the amplified signal.

14. The method of claim 13, wherein switching from the normal power mode to the reduced power mode comprises reducing a duty cycle of the pulsed operation.

15. The method of claim 1, wherein switching from the normal power mode to the reduced power mode comprises reducing a data rate of the transmit signal.

16. The method of claim 15, further comprising:

notifying a modem of the reduced power mode; and receiving, at the transmit amplifier, the transmit signal having a reduced data rate from the modem.

17. The method of claim 1, further comprising:

selecting a first power level in the reduced power mode based on a plurality of modulation and coding values.

18. The method of claim 17, wherein the plurality of modulation and coding values are organized according to a signal quality range, and wherein the first power level in the reduced power mode is associated with a next step down in the signal quality range from a modulation and coding value associated with a second power level in the normal power mode.

19. The method of claim 1, wherein the switching operation of the transmit amplifier is switched from the normal power mode to the reduced power mode to reduce a power level of the amplified signal further based at least in part on an operation of the transmit amplifier in a ground environment.

20. A satellite terminal for mounting within an enclosure beneath a radome on an exterior of an aircraft, the satellite terminal comprising:

a transmit amplifier to amplify a transmit signal to generate an amplified signal, the transmit amplifier having a normal power mode corresponding to a first power level of the amplified signal and a reduced power mode corresponding to a second power level of the amplified signal, the second power level less than the first power level;

an antenna to transmit the amplified signal through the radome;

a temperature sensor to produce a temperature signal indicating a temperature of the transmit amplifier; and a mode control circuit to provide a power mode control signal to the transmit amplifier to switch from the normal power mode to the reduced power mode when the temperature indicated by the temperature signal is greater than or equal to a first temperature threshold.

21. The satellite terminal of claim 20, the transmit amplifier further comprising:

a transistor; and a power control circuit to control the transistor according to the power mode control signal.

22. The satellite terminal of claim 21, wherein:

the power control circuit comprises a gate bias circuit to apply a first gate bias voltage to a gate of the transistor in the normal power mode and a reduced gate bias voltage to the gate of the transistor in the reduced power mode.

23. The satellite terminal of claim 22, wherein the gate bias circuit comprises:

a voltage divider; and a switch having a first position and a second position, wherein the first position of the switch causes the voltage divider to apply the first gate bias voltage to the gate in the normal power mode, and wherein the second position of the switch causes the voltage divider to apply the reduced gate bias voltage to the gate in the reduced power mode.

24. The satellite terminal of claim 21, wherein:

the power control circuit comprises a drain bias circuit to apply a first drain bias voltage to a drain of the transistor in the normal power mode and a reduced drain bias voltage to the drain of the transistor in the reduced power mode.

25. The satellite terminal of claim 24, wherein the drain bias circuit comprises an adjustable-output direct current to direct current converter (DC-DC converter).

26. The satellite terminal of claim 21, wherein:

the power control circuit comprises:

a gate bias circuit to apply a first gate bias voltage to a gate of the transistor in the normal power mode and a reduced gate bias voltage to the gate of the transistor in the reduced power mode;

a drain bias circuit to apply a first drain bias voltage to a drain of the transistor in the normal power mode and a reduced drain bias voltage to the drain of the transistor in the reduced power mode; and a microprocessor to provide a gate bias control signal to the gate bias circuit according to the power mode control signal and to provide a drain bias control signal to the drain bias circuit according to the power mode control signal.

27. The satellite terminal of claim 26, wherein the power control circuit further comprises:

one or more look-up tables accessible by the microprocessor to store a plurality of voltage bias values used by the microprocessor to generate the gate bias control signal and to generate the drain bias control signal.

28. The satellite terminal of claim 20, wherein the mode control circuit is electrically coupled with the temperature sensor to output a second power mode control signal to switch the transmit amplifier from the reduced power mode to the normal power mode when the temperature of the transmit amplifier is less than or equal to a second temperature threshold.

29. The satellite terminal of claim 28, wherein the second temperature threshold is less than the first temperature threshold.

30. The satellite terminal of claim 20, wherein the first temperature threshold is a predetermined number of degrees less than a maximum operational temperature of the transmit amplifier.

* * * * *